US005113959A

United States Patent [19]

Mastov et al.

[11] Patent Number: 5,113,959

[45] Date of Patent: May 19, 1992

[54] ELECTRIC DRIVE ATTACHMENT FOR A WHEELCHAIR

[75] Inventors: Eduard Mastov; Yehezkel Mautner, both of Jerusalem; Zvi Gilad-Smolinsky, Haifa; Moshe Levy, Kibbutz Tzora, all of Israel

[73] Assignee: Propel Partnership 1987, Jerusalem, Israel

[21] Appl. No.: 575,222

[22] Filed: Aug. 30, 1990

[30] Foreign Application Priority Data

Sep. 10, 1989 [IL] Israel ........................................ 91588

[51] Int. Cl.[5] .............................................. B60K 7/00

[52] U.S. Cl. .................................... 180/11; 180/65.6; 180/907

[58] Field of Search ................. 180/11, 13, 65.1, 65.3, 180/65.5, 907, 65.6; 280/304.1

[56] References Cited

U.S. PATENT DOCUMENTS

| | | | |
|---|---|---|---|
| 1,423,090 | 7/1922 | Delano | 180/65.3 |
| 3,059,713 | 10/1962 | Beggs | 180/11 |
| 3,561,555 | 2/1971 | Carmichael | 180/11 |
| 3,705,638 | 12/1972 | Shock | 180/11 X |
| 3,719,247 | 3/1973 | Hollis | 180/65.1 X |
| 3,905,437 | 9/1975 | Kaiho et al. | 180/907 X |
| 3,941,198 | 3/1976 | Kappas | 180/11 |
| 4,019,597 | 4/1977 | Carmichael | 180/13 X |
| 4,566,707 | 1/1986 | Nitzberg | 180/907 X |
| 4,750,578 | 6/1988 | Brandenfels | 180/907 X |

*Primary Examiner*—Andres Kashnikow
*Assistant Examiner*—Michael Mar

[57] ABSTRACT

An electric drive attachment for a wheelchair. The drive includes an electric motor constituting the input member of the drive, a wheel adapted to touch the ground and to drive the wheelchair by frictional contact with the ground, and the wheel constituting the output member of the drive. The input member and the output member constitute an integral unit carried by a sleeve-like member slidably mounted to a first position of a mounting member attachable to the wheelchair, and first means are provided to allow the unit to be shifted to, and arrested at, at least two different positions along the first position of the mounting member. In the first position the unit is closer to a reference point on the wheelchair and in the second position the unit is more remote from the reference point.

8 Claims, 9 Drawing Sheets

ELECTRIC DRIVE ATTACHMENT FOR A WHEELCHAIR

The present invention relates to an electric drive attachment for a wheelchair for persons having temporarily or permanently lost the use of their legs.

Electrically driven wheelchairs are known both in the form of the so-called power chair, which is very expensive and heavy (100 kg and more), cannot be driven manually and is not immediately foldable, and the much less expensive, easily foldable, manually drivable wheelchair equipped with an auxiliary electrical drive.

While these auxiliary drives constitute a significant advance in the effort to increase the mobility of the handicapped without eliminating the possibilities of exercising the active muscles left to, for instance, the paraplegic (arms, hands, back, chest, abdominal), they suffer from some drawbacks. Thus these known auxiliary drives cannot be used to assist the wheelchair in climbing over or onto obstacles of any appreciable height, for instance, to drive from the road level onto the pavement, or, for that matter, to descend, rather than drop, from the pavement onto the road at a relatively slow and controlled speed. Another disadvantage of the above-mentioned known auxiliary drives resides in the fact that, in order to fold the wheelchair, e.g., for transport in a car, the entire drive unit must be detached, including the mounting member and its clamps, the electrical leads and the Bowden cable used for control.

It is one of the objects of the present invention to overcome the above-mentioned disadvantages and drawbacks, and to provide an electric drive attachment for wheelchairs that will permit the user of a wheelchair to easily and effortlessly negotiate curbstones and similar obstacles, and to fold the wheelchair, e.g., for transport, without the need for dismounting the attachment prior to folding.

According to the invention, this is achieved by providing an electric drive attachment for a wheelchair comprising an electric motor constituting the input member of said drive, a wheel adapted to touch the ground and to drive said wheelchair by frictional contact with said ground, said wheel constituting the output member of said drive, wherein said input member and said output member constitute an integral unit carried by a sleeve-like member slidably mounted on a first portion of a mounting member attachable to said wheelchair, first means being provided to allow said unit to be shifted to, and arrested at, at least two different positions along said first portion of said mounting member, in the first of which positions said unit is closer to a reference point on said wheelchair and in the second of which positions said unit is more remote from said reference point.

The invention further provides an electric drive attachment for a wheelchair comprising an electric motor constituting the input member of said drive, a wheel adapted to touch the ground and to drive said wheelchair by frictional contact with said ground, said wheel constituting the output member of said drive, wherein said input member and said output member constitute an integral unit carried by a sleeve-like member slidably mounted on a carrier arm releasably attachable to a mounting member affixable to said wheelchair, first means being provided to allow said unit to be shifted to, and arrested at, at least two different positions along said carrier arm, in the first of which positions said unit is closer to a reference point on said wheelchair and in the second of which positions said unit is more remote from said reference point.

The invention will now be described in connection with certain Preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

IN THE DRAWINGS

Figures 1, 2:
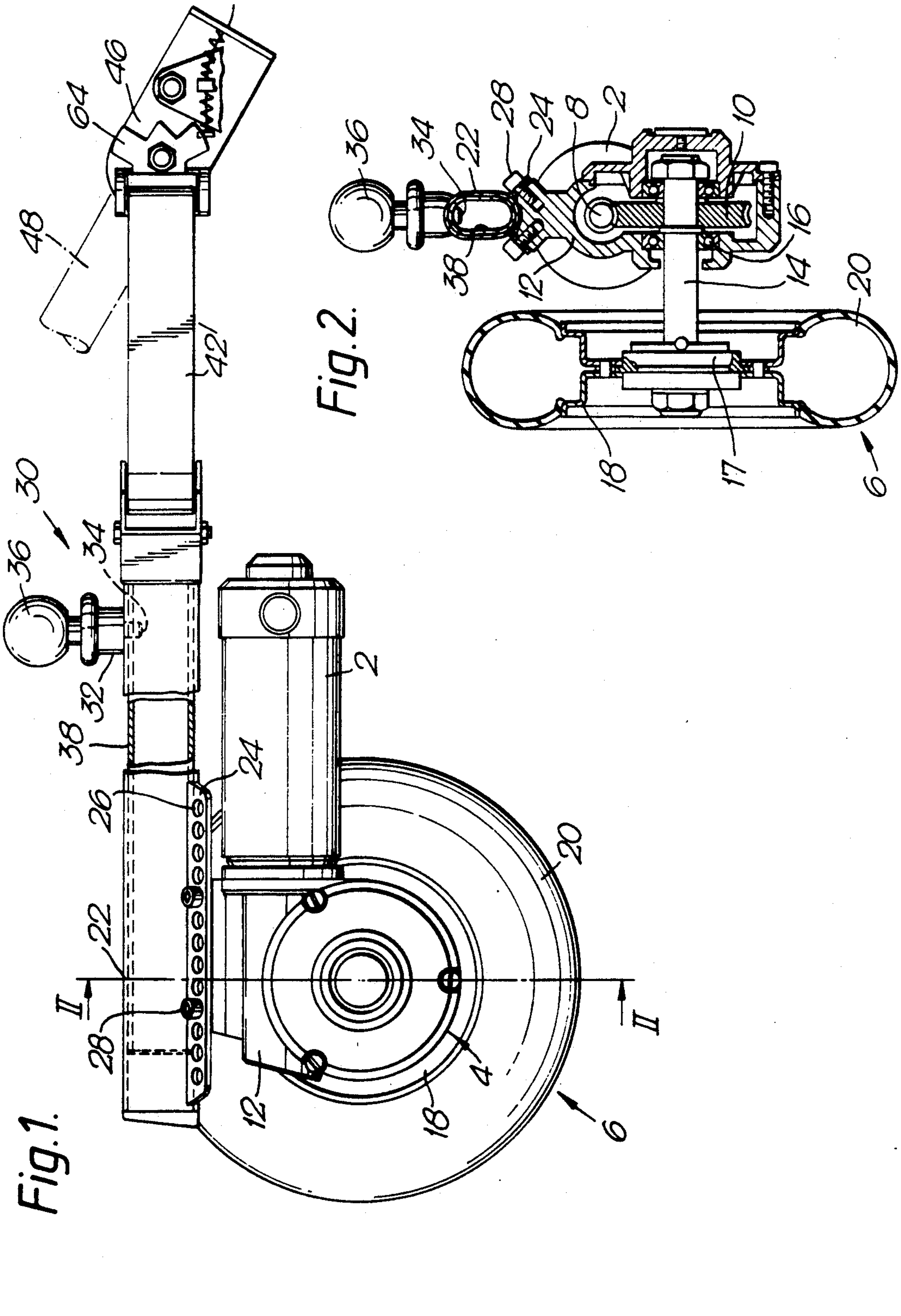
FIG. 1 is a side view of an embodiment of the drive attachment according to the invention.
FIG. 2 is a view, in cross-section along plane II—II, of the drive attachment of FIG. 1.
Figures 3, 5, 6:
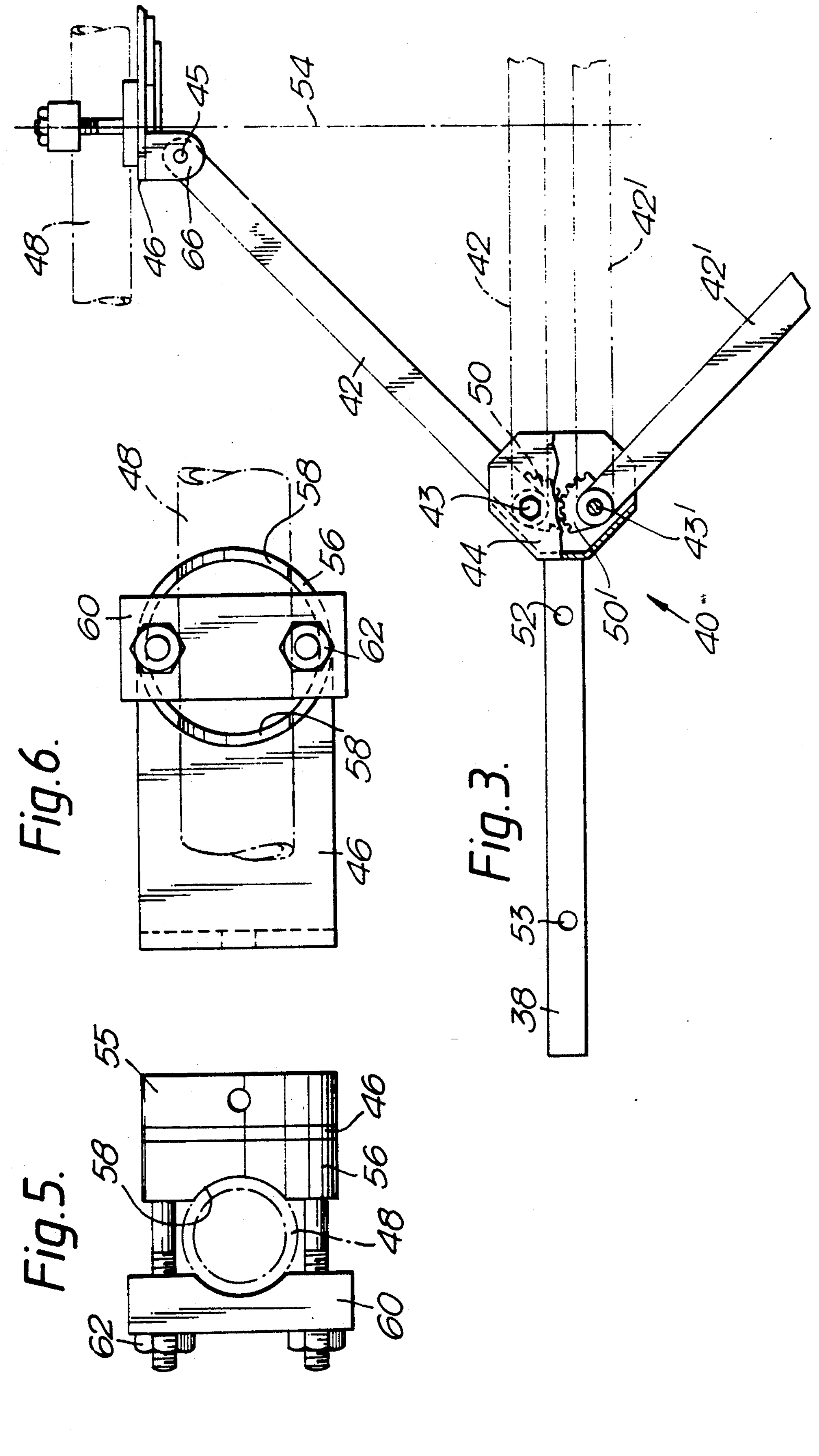
FIG. 3 is a top view, in partial cross-section, of the mounting member.
FIGS. 5 and 6 illustrate the manner in which the brackets are attached to the wheelchair frame.

Referring now to the drawings, there is shown in FIGS. 1 to 3 a first embodiment of the drive attachment according to the invention, seen to comprise an electric motor 2, a speed reducer 4 and a drive wheel 6 which, in a manner to be explained in detail further below, is adapted to touch the ground and, thus, drive the wheelchair by frictional contact with this ground.

The motor 2 used is a D.C. motor, advantageously of the permanent-magnet type and, as will be explained in greater detail further below, is arranged to operate at either 30V or 18V. The motor is hermetically sealed and thereby protected against penetration of dust and other abrasive particles. This allows use of a very narrow air gap, resulting in extremely high flux densities of the magnetic field provided by strontium ferrite ceramic magnets. The commutators are diamond-turned after assembly of the armature, to ensure optimum concentricity and long brush life. Brushes are of the silver-graphite type. All these features combine to produce a motor with an unusually high efficiency of about 88% which, at a dissipated power of 25W, generates an active power of about 175W.

The relatively high motor speed is reduced at a ratio of 1:35 by the speed reducer 4 which, in this embodiment, has the form of a worm 8 fixedly attached to the motor shaft (not shown) and a worm wheel 10, both accommodated in a split housing 12, to one part of which the motor 2 is fixedly attached. The worm 8 in this embodiment has a lead angle large enough to prevent the worm gearing from being self-locking or irreversible, a situation where the worm (i.e., the motor) can drive the worm wheel, but cannot be driven by the latter. The implications of this fact will be discussed hereinafter.

The worm wheel 10 is keyed to the shaft 14 mounted in ball bearings 16 accommodated in the split housing 12. The shaft 14 projects from the housing 12 on one side thereof, as clearly seen in FIG. 2. To this overhanging portion of the shaft 14 is firmly keyed the metal hub 17 of the drive wheel 6, to which hub is attached a wheel rim 18 carrying a rubber tire 20. In a variant of the drive attachment, an overrun clutch is interposed between the shaft 14 and the drive wheel 6, which permits the wheel 6 to rotate freely when on the ground without the motor working (such as in travel down a slope). Without such an overrun clutch, the wheel would be dragged on the ground, as the resistance of the reduction gear would not permit it to rotate at the speed appropriate to the speed of advance of the wheelchair.

Further seen is a carrier sleeve 22 of an oblong cross section provided with two slanting, wing-like projections 24 having a plurality of holes 26, selected pairs of which serve to attach to the carrier sleeve 22 the unit: motor 2, speed reducer 4, drive wheel 6, by means of screws 28. The plurality of holes 26, the center distance of which is a submultiple of the distance between the screws 28, permits the above unit to be attached at different points along the carrier sleeve 22 which, as will become apparent further below, is of importance for the proper mounting of the drive attachment on a wheelchair.

Also mounted on the carrier sleeve 22 is a detent member 30 comprising a socket 32 fixedly attached to the sleeve 22, a plunger 34 guided in the socket 32, and a knob 36 whereby the plunger 34 can be manually pulled up against the restoring force of a compression spring (not shown).

The carrier sleeve 22 is slidably mounted on the stem portion 38 of a substantially Y-shaped mounting member 40 (FIG. 3), the arms 42, 42' of which are hingedly articulated to an end piece 44 of the stem portion 38 on one side, and to mounting brackets 46, 46' (bracket 46' not shown), at the other side which, in this embodiment, are clamped to the horizontal frame members 48 of the wheelchair. Both the stem 38 and the arms 42, 42' are advantageously made of a tubular material and have an oblong cross section, the stem 38 slidingly fitting the carrier sleeve 22, as indicated above (see also FIG. 2).

Further seen are two holes drilled into the upper, narrow side of the stem profile: a first hole 52 adjacent to the end-piece-side end of the stem 38 and a second hole 53 adjacent to the free end of the stem 38. These holes serve as locators for the detent plunger 34 (FIG. 1), permitting the carrier sleeve 22 to be shifted between, and arrested at, two different positions along the stem portion 38. For shifting, the knob 36 is pulled up, causing the plunger 34 to withdraw from the hole. Then, still using the knob 36, the carrier sleeve 22 is slid along the stem 38, with the plunger 34 riding on the stem surface. When the second position is reached, the spring-loaded plunger will drop into the second hole, and the carrier sleeve 22 will be arrested.

Articulation at the end-piece-side ends give the arms 42, 42' one degree of freedom in rotation about the pivots 43, 43' which extend in a direction perpendicular to the general plane containing the mounting member 40, while articulation at the brackets 46, 46' is like a universal joint, providing one degree of freedom of rotation about the pivots, 45, 45' as well as about the axis 54 which extends in a direction parallel to the axis of the wheelchair rear wheels.

The articulation arrangement involving pivots 43, 43' and 45, 45' permits the wheelchair to be folded with the mounting member 40 in position, inasmuch as the arms 42, 42' can be folded from the fully open, diverging state represented in FIG. 3 in solid lines, to a collapsed state, indicated by the dash-dotted lines, in which they are more or less parallel. What is more, the provision, at the end-piece double hinge, of two meshing gear segments 50, 50' permits folding to take place only with the two arms moving simultaneously and in symmetry about the longitudinal axis of the mounting member 40. This greatly facilitates collapsing of the wheelchair and prevents lateral forces possibly acting on the drive wheel 6 from straining or even distorting the wheelchair frame.

Tiltability of the mounting member 40 about the axis 54 as provided by the universal-joint arrangement of articulation at the brackets 46, 46' is required because, on the one hand, the drive wheel 6, carried (along with the motor 2, etc.) by the mounting member 40 must ride on the ground, as driving is effected by frictional contact of the wheel with the ground and, on the other, provision must be made to eliminate this contact, i.e., lift the drive wheel 6 off the ground, whenever help by the attachment is not required.

Figure 4:
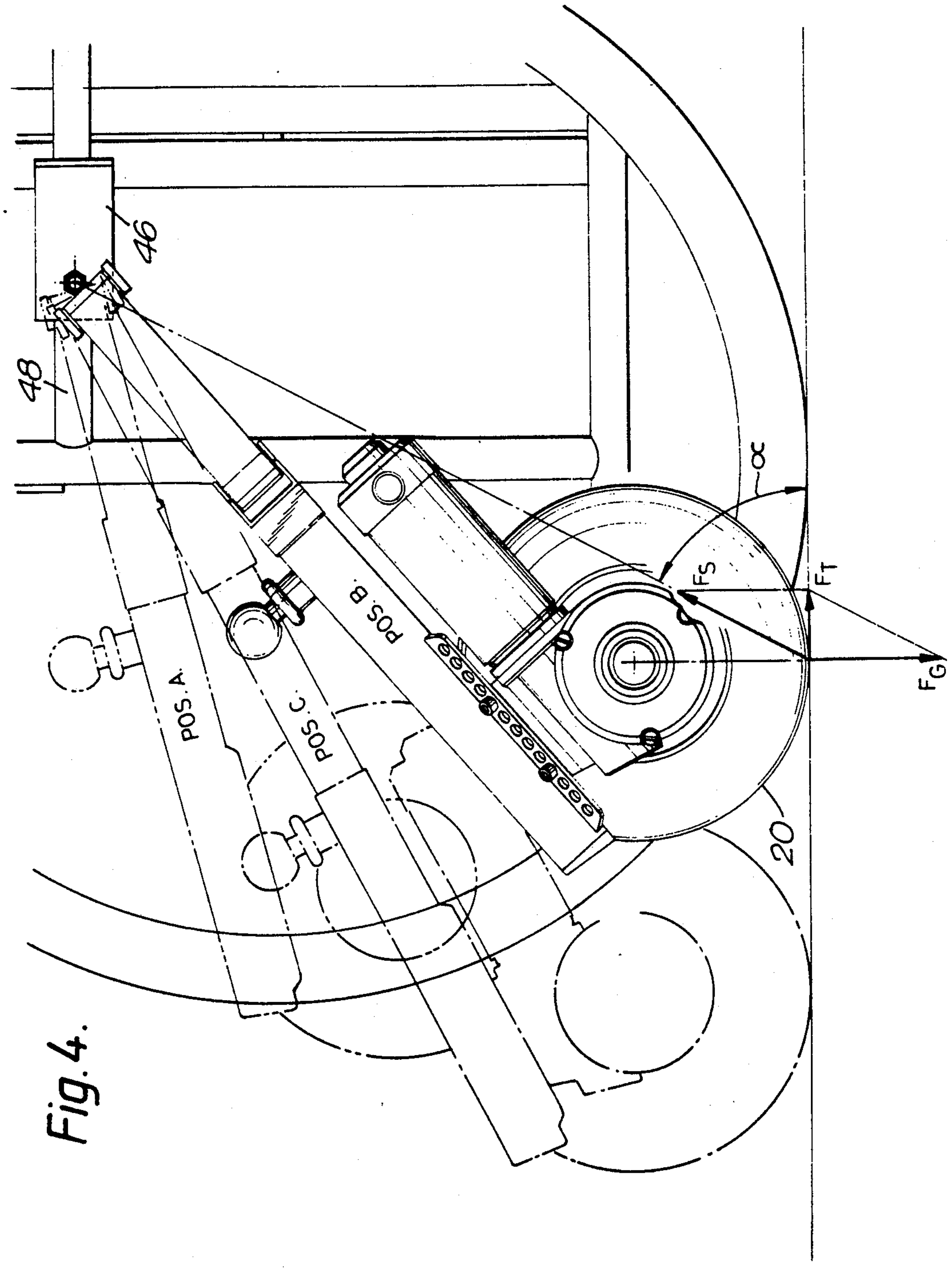
FIG. 4 is a schematic view showing, in superposition, the three positions assumable by the drive attachment according to the invention as well as the forces coming into action.

The various positions the drive wheel 6 must be adapted to assume are illustrated in FIG. 4 which, in superposition, clearly illustrates the three positions selectively obtainable:

Position A, in which the drive unit has been lifted off the ground and which is used for purely manual driving of the wheelchair;

Position B, a ground-contacting, power-drive position, in which the angle of inclination of the mounting members is the steepest and which is used for general power driving, and Position C, also a ground-contacting, power-drive position, used for climbing onto, or descending from, such obstacles as curbstones or the like, and explained in greater detail further below.

The above functions are provided by the bracket 46 and its components (FIGS. 5 to 9). The bracket 46 is a steel strip of a thickness of about 3 mm with a bent-over edge 55 on one side and a rounded end on the other. To this end is welded a ring-like projection 56 in which are provided two concave recesses 58 of a curvature that fits the horizontal frame members 48 of the wheelchair. (For reasons of space, the mounting frame 40 and its components has been drawn in a horizontal position, when it should be inclined as in FIG. 4. Because of this, the wheelchair-frame member 48 appears to be inclined. In reality, frame member 48 is horizontal or nearly horizontal).

A similar concave recess 58 is provided in a clamping block 60 and, with the wheelchair frame member 48 seated in these two pairs of recesses, the brackets 46, 46' are firmly attached to the frame member by tightening the nuts 62.

Figure 7:
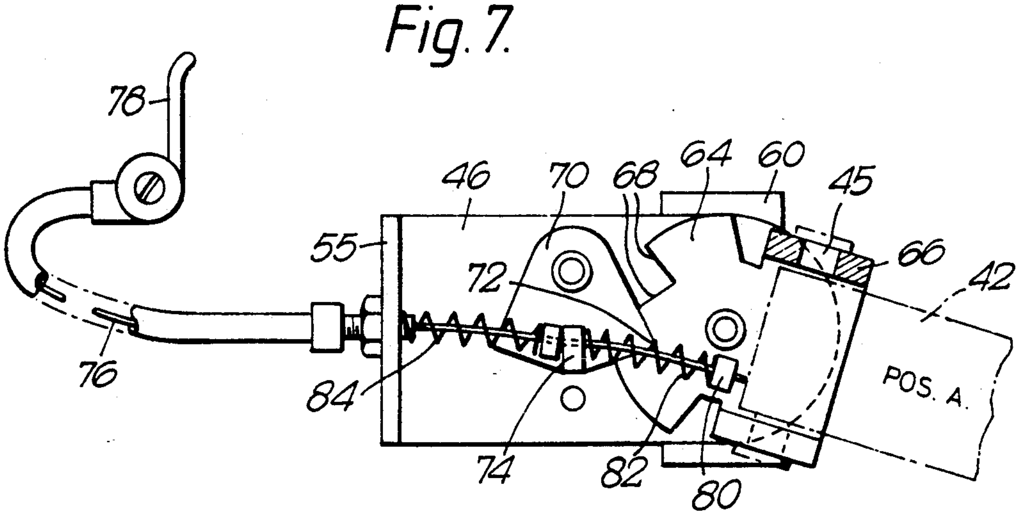
FIGS. 7 to 9 illustrate successive stages in locking and unlocking the mounting member.

The bracket mechanism is shown in FIG. 7. There is seen a locking disk 64, pivotally mounted on the bracket 46, which at the same time also serves as hinge for the upper end of the arm 42, having two lugs 66, raised from the disk material, through which lugs passes the pivot 45. The locking disk 64 has two locking notches 68 (of which only the lower one is active, the upper one enabling the bracket unit 46 to be mounted on the other side of the wheelchair, in which inverted position it becomes the lower notch).

The locking disk cooperates with a latch 70 also pivotally mounted on the bracket 46. In the position shown in FIG. 7, the latch 70 with its nose 72 engages the active notch 68, maintaining the drive unit in position A (FIG. 4) in which the drive wheel 6 is lifted off the ground.

The latch 70 is further provided with a post 74 through a hole in which is threaded one end of a Bowden cable 76, the other end of which is connected to a Bowden-cable handle 78 of the known type mounted on the wheelchair frame in a position of easy accessibility. In FIG. 7, the handle 78 is in the "lock" position. The bracket end of the Bowden cable is provided with a terminal piece 80, soldered, crimped or screwed to the cable. Also provided is a first helical compression spring 82, mounted on the cable 76 between the terminal piece 80 and the post 74, and a second compression spring 84, mounted on the cable 76 between a washer 86 resting against the post 74, and the bracket edge 55.

Figure 8:
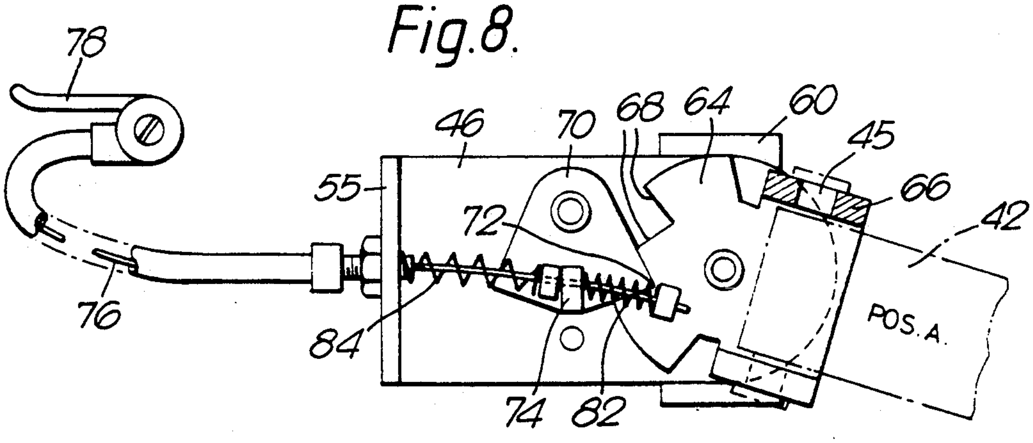

FIG. 8 illustrates the first step to be taken in order to lower the drive attachment from position A (FIG. 4) to position B.

Figure 9:
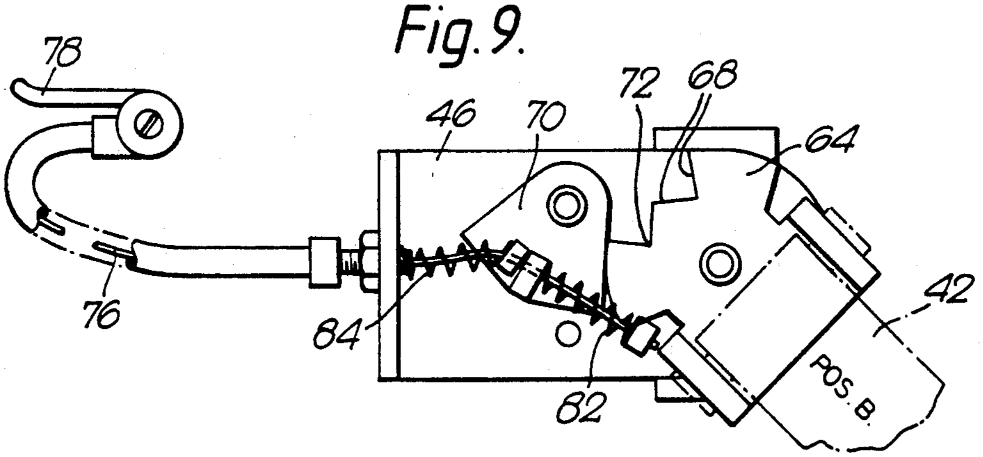

Handle 78 is moved from the "lock" position in FIG. 7 to the "unlock" position, causing the cable 76 to be pulled in, as a result of which the spring 82 is compressed, acting against the post 74 and, thus, tending to unlatch the latch 70. However, friction at the interacting faces of the locking disk 64 and the latch 70, caused by the moment produced by the weight of the drive attachment including the mounting member, cannot be overcome by the relatively weak spring 82. The next step required is therefore to eliminate this moment. This is easily accomplished by the user of the wheelchair, who reaches behind the backrest, grips the drive attachment at any convenient point, for instance at the knob 36 (FIG. 1), and lifts it up for a short distance. This slight lift is enough to reduce friction sufficiently for the compressed spring 82 to push the latch 70 out of reach of the notch 68. The user then lowers the drive attachment to the ground. The ensuing situation is illustrated in FIG. 9.

When now a return to position A is desired, all that has to be done is to restore the handle 78 to the "lock" position as seen in FIG. 7 and to again slightly lift the drive attachment, until a "click" is heard. This click signifies that the second spring 84, which in the latch position illustrated in FIG. 9 has been slightly compressed, has been able to return the latch 70 to its notch 68, now in register. The drive attachment can now be released and will settle in position A.

The locking disk-and-latch arrangement explained in the aforegoing pertains only to bracket 46. Bracket 46', in addition to its function as point of articulation of the arm 42', has the further function of preventing the angle u (FIG. 4) from exceeding a maximum value. By way of explanation, a line has been drawn connecting the point of tangency of the drive wheel tire 20 and the point P which is the point of suspension of the drive attachment (being the pivot of the detent disk 64). $F_T$ is the tangential force, parallel to the ground, produced by the drive wheel and resolved into the ground force $F_G$ and the force $F_S$ acting through the suspension point P on the wheelchair. It is evident that, providing angle $\alpha$ is sufficiently large, a relatively small tangential force will produce a relatively large force $F_G$ acting into the ground and providing the necessary friction in spite of the relatively small weight of about 3 kg of the drive wheel assembly.

In fact, the force $F_G$ will increase with increasing resistance encountered by the wheelchair, and it is clear from FIG. 4 that if the suspension point P—which can move only together with the chair—is prevented from advancing at the speed of travel of the drive wheel 6, the latter will simply try to "overtake" point P by increasing the angle $\alpha$, thereby increasing the components $F_G$ and $F_S$ even further. An increase of $\alpha$, as is obvious from the geometry of the arrangement, is, however, possible only by causing point P to rise—in other words, by lifting the rear wheels of the wheelchair off the ground. To prevent such an undesirable situation from arising, the angle $\alpha$ must not be permitted to increase beyond a magnitude that would cause the rear wheels to lose contact with the ground.

Figure 10:
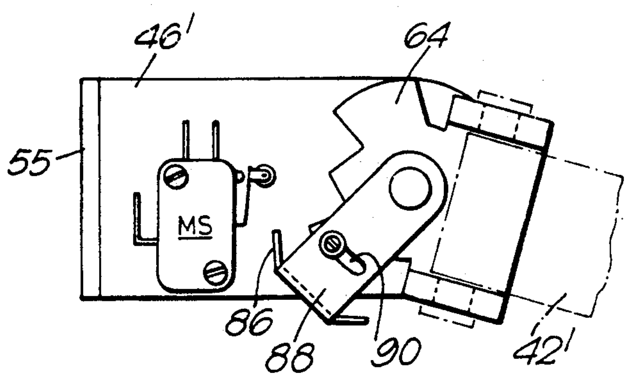
FIG. 10 shows a microswitch arrangement limiting the steepness of the mounting member.

To this end, there is provided, attached to the bracket 46', a microswitch MS (FIG. 10) actuated by a tripping ramp 86 which is a part of an arm 88 attached to, and moving together with, a modified locking disk 64 whose sole task is now to serve as hinge for the mounting arm 42' and transfer the movement thereof to the tripping arm 88. The latter is also provided with an arched slot 90 to facilitate the setting of a permissible angle $\alpha$, the exceeding of which will cause the microswitch MS to cut off the current to the motor 2.

Provision is also made for a purely mechanical stop (not shown), the purpose of which is to prevent excessive swivel in case of, e.g., potholes in the ground as well as to act in case of failure of the microswitch.

Allowing for the differences between various wheelchair types concerning the distance, from the ground, of the frame members 48, it is obviously necessary to be able to vary the total length of the drive attachment in order to obtain an optimum angle $\alpha$ (about 65°) in the general-drive position B. This angle is attained by selecting suitable pairs of holes 26 on the wing-like projections 24 for attaching the drive wheel 6 to the carrier sleeve 22.

A characteristic feature of the drive attachment according to the invention is that it will permit the user of a wheelchair to climb over or onto obstacles, for instance, to drive from the road level onto the pavement or to descend, rather than drop, from the pavement onto the road at a relatively slow and controlled speed.

To obtain this capability, the drive wheel 6 must be brought to position C (FIG. 4), in which, because of the extended length of the drive attachment, angle $\alpha$ is much smaller and, therefore, the above mentioned tendency of rear-wheel lift-off or, alternatively, stoppage of the motor by the microswitch arrangement before climbing has even been properly initiated, is avoided. Switch-over to position C is easily effected, using the procedure indicated in connection with FIG. 3 and the locator holes 52 and 53 in the stem portion 38 of the mounting member 40.

Position C having been arranged, there are two ways to get the wheelchair onto the pavement:

1. One drives the wheelchair manually close to the curbstones and then performs a "wheelie" to get the small front wheels onto the pavement ("Wheelie" is a term well known to users of wheelchairs and refers to a reaction phenomenon produced by a sudden and forceful application of a forward drive force to the rims of the rear wheels. Due to the inertia of the masses involved, the wheelchair can be made to tip backwards by way of reaction, lifting the front wheels off the ground).

With the front wheels on the pavement, the motor 2 is switched on at high speed and will push the wheelchair onto the pavement. (The electrical circuit of the drive attachment will be discussed further below).

2. The curbstones are approached with the motor working at high speed. About one meter in front of the curbstones, one performs a "wheelie," driving on the rest of the way on the rear wheels only, until the front wheels land on the pavement. When the rear wheels hit the curbstones, the drive attachment will lift the wheelchair onto the pavement.

Controlled descent is possible due to the fact, already mentioned before, that the speed reducer 4 has "backdriving" capability, i.e., the motor 2 can be driven by the worm wheel 10 (which is mounted on a common shaft with the drive wheel 6). The motor 2 can thus be used as a generator and, by inserting into the circuit, in parallel with the motor brushes, a diode 92, a braking effect is attained.

This effect can be used to brake descent from a pavement. The drive arrangement is again in position C and the user approaches the edge of the pavement with his back facing the road. With the motor switch $S_1$ on ON, while all other switches are on OFF, the edge is approached by driving manually. First to reach the road level is the drive wheel 6 which is braked by the diode circuit, thus providing a "soft" landing when the rear wheels descend from the curbstones. When the braking effect is not desired, the switch $S_1$ must be in the OFF position.

The braking effect of the diode can obviously also be used as a safety precaution against sliding down an incline.

Figure 11:
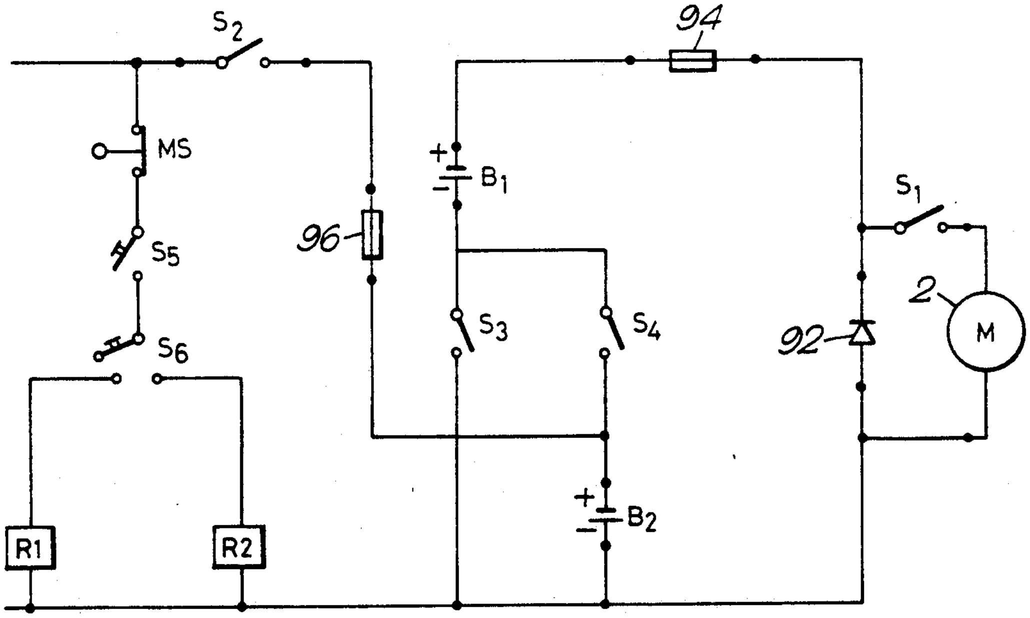
FIG. 11 represents the circuit diagram of the drive attachment according to the invention.

The circuit diagram of FIG. 11 includes a power circuit working either on 18V (low speed, about 2 km/h) or on 18+12=30V (high speed, about 5 km/h), and comprises the motor 2, a motor switch $S_1$, two batteries $B_1$=18V (three 6V cells) and $B_2$=12V (two 6V cells), contacts $S_3$ and $S_4$ of speed selector relays, a 15-A fuse 94 and the above-mentioned diode 92.

The control circuit works on 12V and comprises a cut-off switch ON-OFF $S_2$, a small toggle switch $S_5$ ON-OFF (located near the right rear wheel and serving as main control switch), a small toggle switch $S_6$ OFF-ON-ON (located near the left rear wheel, and serving as main control switch and speed selector), two relays $R_1$ and $R_2$ for actuating the speed-control contacts $S_3$ and $S_4$ in the power circuit, the already described microswitch MS and a 0.5A fuse 96.

The drive attachment according to the invention is retrofittable to all standard wheelchairs.

While in contradistinction to prior art auxiliary drives, wheelchairs using the drive attachment according to the invention can be folded with the entire attachment in position, the drive wheel unit (wheel, motor 2, speed reducer 4 and carrier sleeve 22) is removed with the greatest ease and within seconds, thereby reducing the weight of the folded chair, which makes subsequent handling easier (e.g., stowing away in a car, etc.).

In a different embodiment, the mounting brackets 46, 46' can also be attached to vertical members of the wheelchair frame.

While the speed reducer 4 of the above embodiment is of the worm- and worm wheel type, gear-train reductors could also be used.

A further embodiment of the drive attachment according to the invention differs from the previously discussed embodiment in several details to be explained in the following.

Figure 12:
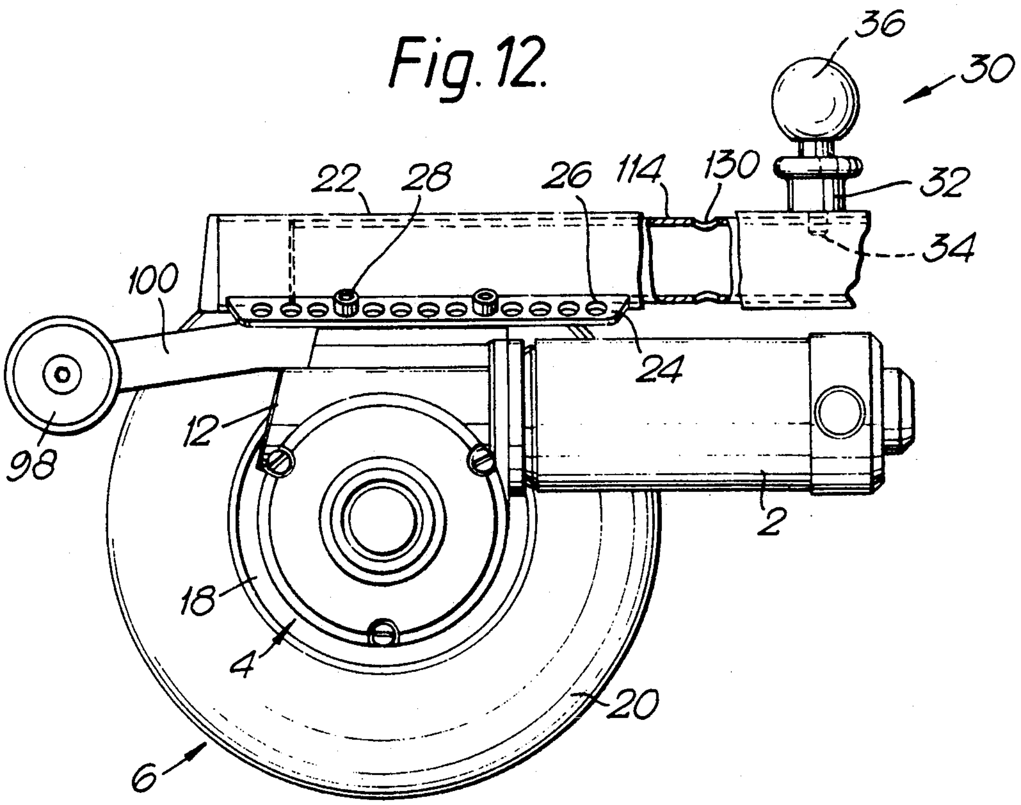
FIG. 12 is a side view of a second embodiment according to the invention.

Should the microswitch MS (FIG. 10) fail, there is now provided a fallback element in the form of a roller 98 mounted on an arm 100 fixedly attached to the speed reducer unit 4 (FIG. 12).

Figure 13:
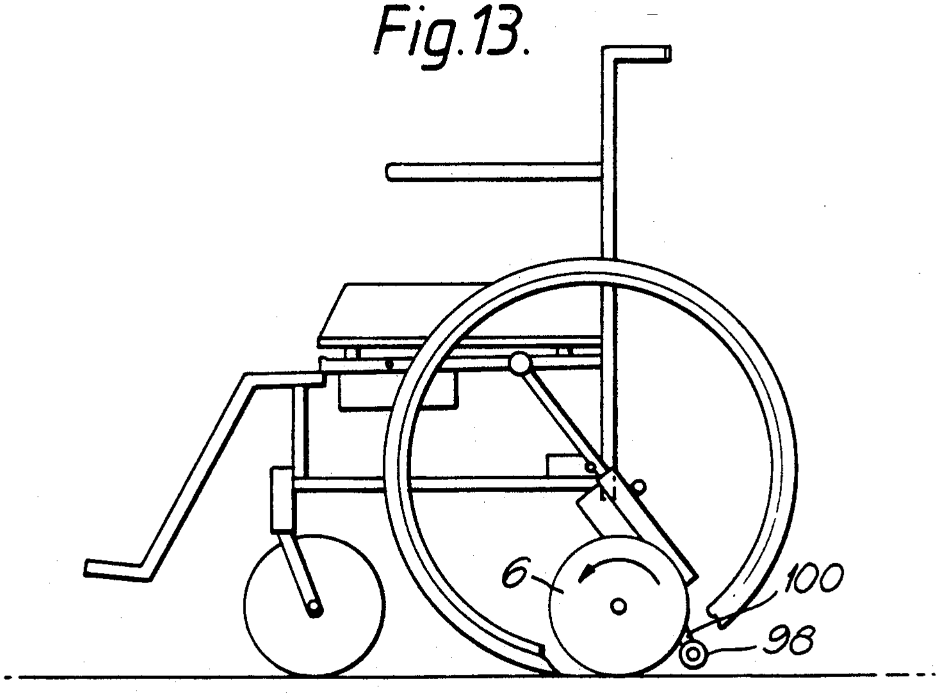
FIG. 13 shows the wheelchair in normal, motor-assisted travel.
Figure 14:
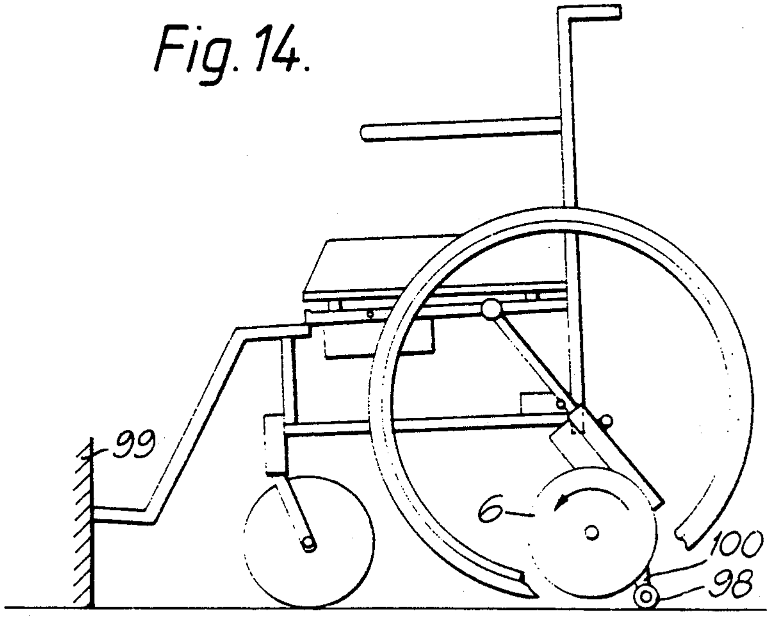
FIG. 14 illustrates a situation in which the wheelchair encounters an obstacle.

The action of this additional safeguard is illustrated in schematic FIGS. 13 and 14 (in which the occupant of the wheelchair is not shown). FIG. 13 shows the wheelchair during normal travel, with the spatial relationship between the roller 98 and the drive wheel 6 such that, with the latter in the drive position B (FIG. 4), the roller 98 is off the ground. Should the wheelchair encounter an obstacle 99 as schematically indicated in FIG. 14, this, as has been explained earlier, will not prevent the drive wheel 6, which continues to rotate, from advancing below the wheelchair. Yet because of the tilt of its mounting (see FIG. 4), this will cause the rear wheels of the wheelchair to be lifted off the ground. Should the microswitch MS fail to stop the drive when the angle $\alpha$ (FIG. 4) increases beyond a predetermined value, the roller 98, because of this increased angle $\alpha$, will now be pressed against the ground and cause the drive wheel 6 to lose effective drive contact with the ground.

The action of the microswitch MS, too, has been modified in this embodiment. While in the previous embodiment the motor circuit was re-established once the microswitch MS reset itself when the angle $\alpha$ was reduced to below the limit, in the present embodiment resetting of the microswitch MS will not in itself reactivate the motor M. To do so, switch $S_5$ must be first set to OFF and then again to ON. This enhances safety and ensures better controllability of the wheelchair.

Figure 17:
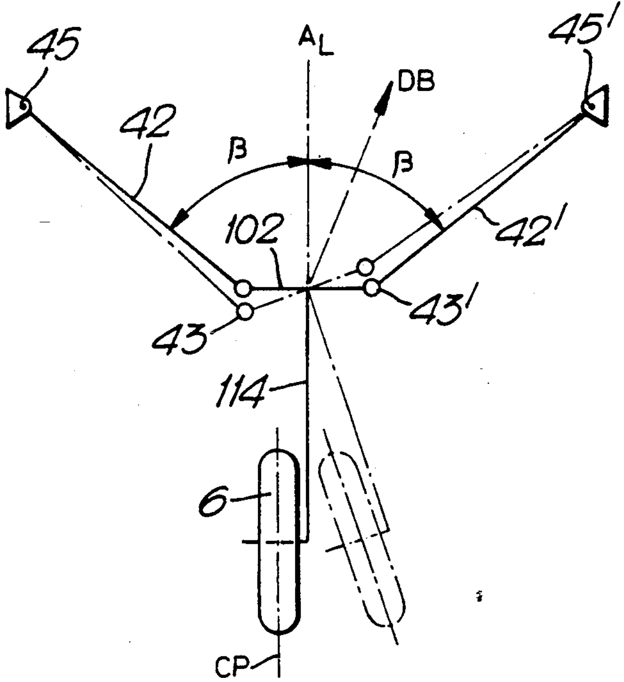
FIG. 17 is a kinematic diagram of the mounting member, showing the effect of distortion on the drive wheel.

The mounting member 40 (FIG. 15) is now V- rather than Y-shaped and the arms 42, 42' are no longer constrained by gear segments 50 (FIG. 3) to move in symmetry relative to the longitudinal axis of the wheelchair. This solution, while elegant from the point of view of kinematic design, did not take into account the phenomenon of lateral drift of a wheelchair equipped with the attachment according to the invention when traveling along a sidewalk with a slight slope toward the road, as practically all sidewalks have for water runoff. This drift can be compensated for by swiveling the vertical central plane CP of the drive wheel 6 slightly out of parallelism with the longitudinal axis $A_L$ of the wheelchair, which action causes the latter to be imparted a directional bias DB as shown in FIG. 17, enough to prevent the above-mentioned drift.

Figure 16:
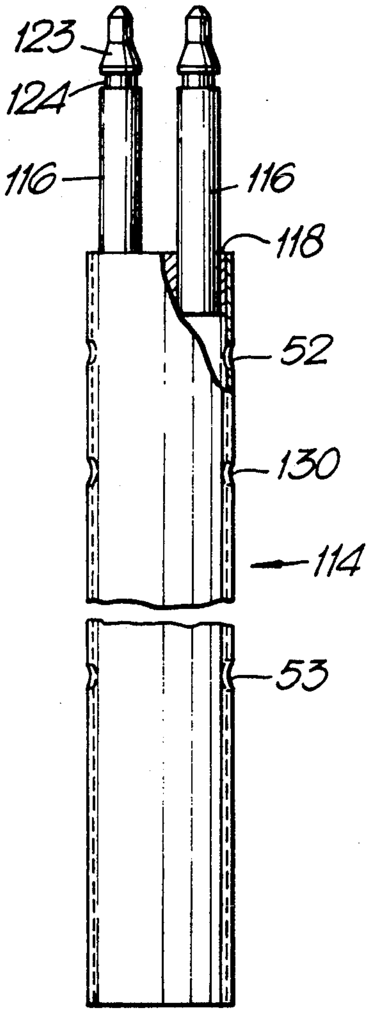
FIG. 16 is a view, in partial cross-section, of the carrier arm of the second embodiment.

This intentional distortion of the symmetry of the bar linkage: arm 42, based piece 102 and arm 42' can be effected in several ways, of which FIG. 16 shows two. The first uses two set screws 104 including locking screws 106, whereby the angles $\alpha$ included between $A_L$ and the arms 42, 42' can be slightly altered, producing the effect shown in FIG. 17 by the dash-dotted lines.

The second solution consists in providing two thumbscrews 108 (FIG. 15) which provide easier accessibility.

A third way of achieving the above result (not shown) would be an adjustment of the effective length of at least one of the arms 42, 42'. To this end, one of the pivots 43 or 43' would be in the form of an eccentric having three portions, a middle portion rotatably seated in the end portion of one of the arms 42, 42', and two end portions rotatably seated in the upper and lower surfaces 110 and 112 respectively of the head piece 102. The two end portions would be concentric with respect to each other, but eccentric with respect to the middle portion. By rotating the eccentric (either with the aid of a screwdriver and slot in the upper portion or of a knob attached to the upper portion), the effective length of the arm 42 or 42' is altered, producing the above result.

Yet another possibility envisaged would involve the controlled displacement, along one of the horizontal frame members 48, of one of mounting brackets 46, 46' (FIG. 5). This could be effected by mounting the bracket not directly on the frame member 48, but on a base plate which is attached to the frame member. The bracket would be slidably guided on that base plate, its movement being controlled by a lockable eccentric.

What was in the previous embodiment the stem 38 of the Y-shaped mounting member 40 is now a separate carrier arm 114 easily attached to the head piece 102 of the mounting member 40 when the drive attachment is being used, and as easily detached for greater compactness of the mounting member prior to folding or when the wheelchair is to be driven without the drive attachment (in rooms, halls, etc.).

Figure 15:
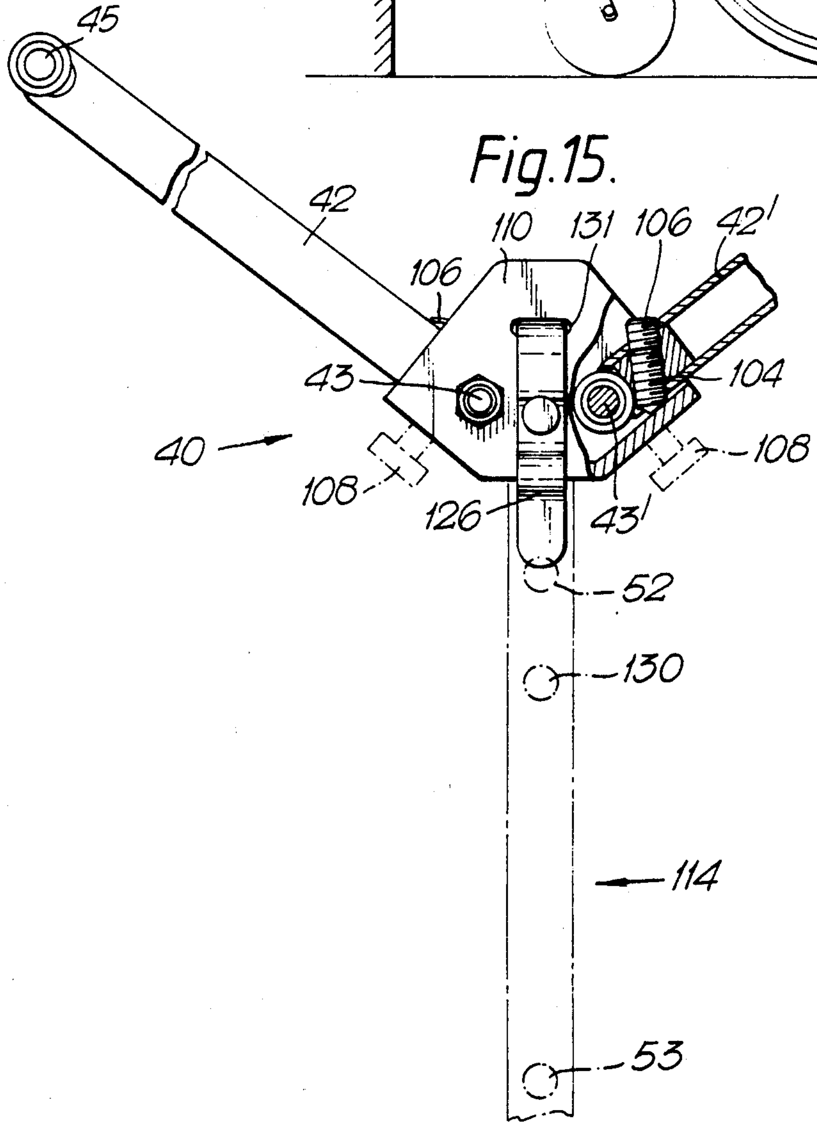
FIG. 15 is a bottom view of the mounting member of the second embodiment according to the invention.
Figure 18:
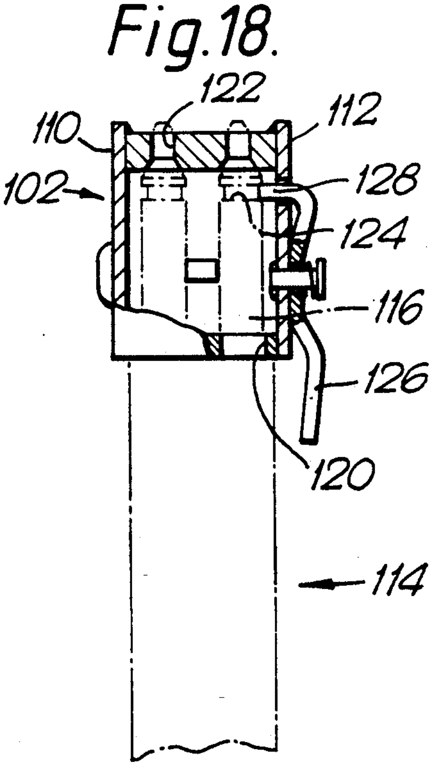
FIG. 18 is a side view, in partial cross-section, of the head piece of FIG. 16.

The carrier arm 114 is seen (FIG. 16) to consist of a hollow profile of an oblong cross-section fitting into the carrier sleeve 22 (FIG. 12) and carries at its front end two large pins 116 pressed into a block 118, which pins fit into a first pair of holes 120 in the front surface of the head piece 102 (see FIG. 18). The ends of the pins 116 taper down to smaller diameters that fit a second pair of smaller holes 122 in the rear surface of the head piece 102. Near the leading taper 123 (FIG. 16) there is provided, in each pin, a groove 124. These grooves serve for retaining the carrier arm 114 in the head piece 102, once it has been pushed into the latter like a two-pin plug. Retention is effected by a catch 126 mounted on the underside of the head piece 102. The catch is spring-loaded and its nose 128 is always pressed inwards through a slot 131 (FIG. 15). To remove the carrier arm 114 in its assembled state, one presses down the free rear end of the catch 126. This causes the nose 128 to withdraw from the groove 124, thus releasing the pin 116, permitting the carrier arm 114 to be withdrawn from the head piece 102.

For assembling, the carrier arm 114 is simply pushed with its pins 116 into the holes 120 of the head piece 102. The catch nose 128 will first ride up on the leading taper 123 (FIG. 16) and then drop into the groove 124, retaining the pin 116. The groove 124 in the second pin 116 is provided for convenience only, so that no attention need be paid to the exact orientation of the carrier arm 114 prior to assembly; it will snap in in either position. For the same reason, the locator holes 52, 53 for the detent plunger 34 (FIG. 12) are provided on both sides of the arm 114. Another pair of locator holes 130 has been added for driving the wheelchair over uneven, bumpy ground. To prevent the safety devices—microswitch and roller—from acting when the drive wheel drops into a pothole, use is made of this additional locator hole 130, which produces a motor position between position B and position C (FIG. 4), in which the angle $\alpha$ is smaller than that produced by position B, while still generating sufficient ground grip. Consequently, an occasional lowering of the drive wheel will not cause the microswitch to respond.

Figure 19:
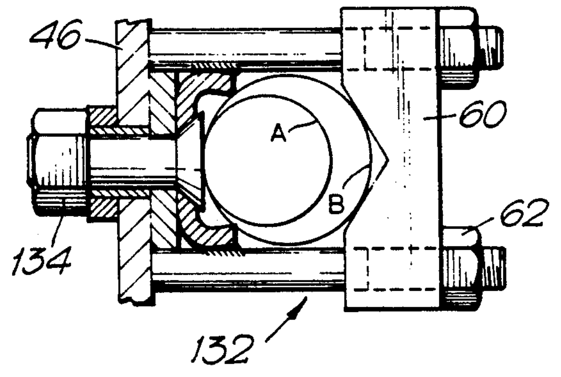
FIG. 19 is a partial cross-sectional view of the clamping unit of the second embodiment, and FIG. 20 schematically shows a wheelchair adapted for use with an attendant.

In the present embodiment, the orientation, in the vertical plane, of the bracket 46 (FIG. 19) is independent of the orientation of the clamping unit 132 which can therefore be attached both to horizontal and vertical (and even slanted) members of the wheelchair. All that is required is to mount the clamping unit 132 wherever convenient, then loosen the nut 134, swivel the bracket until horizontal and retighten the nut 134. The clamping unit is configured to accommodate tubing between 19 mm (A) and 25 mm (B) diameter.

The present embodiment envisages stepless speed regulation between 2.5 and 5.4 km/h. All battery cells are equally used across the entire range.

The batteries are accommodated below the canvas seat of the wheelchair. This counterbalances the weight of the drive attachment behind the chair and therefore does not cause a shifting in the location of the center of gravity after battery and drive attachment are installed.

The drive attachment according to the invention can be used in three different configurations:

a) The wheelchair is to be controlled by its occupant only, in which case all controls are located adjacent to the drive wheels.

b) The wheelchair is to be controlled by an attendant only, in which case all controls are located behind the wheelchair on the pushing handles of the wheelchair.

c) The wheelchair is to be controlled by its occupant and, alternatively, by an attendant, in which case there are provided dual controls.

Figure 20:
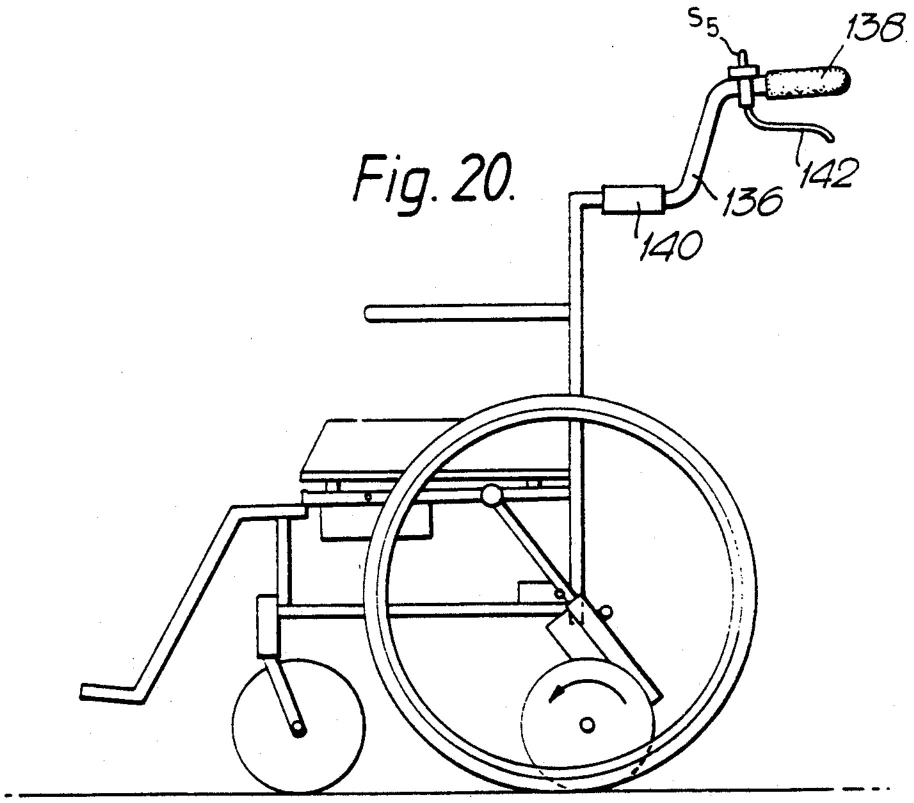

A wheelchair adapted for use with an attendant is schematically shown in FIG. 20. Because of the drive attachment behind the wheelchair, an attendant cannot be as close to the chair as in an ordinary wheelchair. Therefore a pair of auxiliary handles 136 is provided which bring the handle grips 138 further behind and, for individual convenience, also higher up. The auxiliary handle 136 is connected to the wheelchair handles by a connector sleeve 140 and carries the control switch $S_5$ as well as the speed selector switch $S_6$ (not shown) and a brake handle 142.

It will be evident to those skilled in the art that the invention is not limited to the details of the foregoing illustrative embodiment and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electric drive attachment for a wheelchair comprising: wheelchair comprising:

an electric motor constituting the input member of said drive, a wheel adapted to touch the ground by force of gravity only and to drive said wheelchair by frictional contact with said ground, said wheel constituting the output member of said drive, wherein said input member and said output member constitute an integral unit carried by a sleeve-like member slidably mounted on a carrier arm releasably attachable to a mounting member articulatedly affixable to said wheelchair and downwardly tiltable by gravity, first means being provided to allow said unit to be manually shifted to, and arrested at, at least a first predetermined power-drive position and a second predetermined power-drive position along said carrier arm, in the first of which positions said unit is closer to a reference point on said wheelchair and in the second of which positions said unit is more remote from said reference point, wherein in said first power-drive position, said carrier member includes with said ground a first angle, and in said second power-drive position, said carrier member includes with said ground a second angle, said first angle being the angle at which the ground grip of the ground-touching wheel assumes an optimal value and said second angle being smaller than said first angle.

2. The drive attachment as claimed in claim 1, wherein said mounting member is substantially in the form of a V, the two limbs of which have the shape of two arms, the first ends of which are hingedly articulated to a head piece in such a way as to render said arms collapsible from a first position in which the angle included by said two arms is at a maximum, to a second position in which said angle approximates zero, and the second ends of which arms are hingedly articulated to first members of brackets means attachable to members of said wheelchair, whereby said mounting member is adapted to tilt about an axis substantially parallel to the common axis of the rear wheels of said wheelchair.

3. The drive attachment as claimed in claim 2, wherein said first member of at least one of said bracket means is a locking means adapted to co-act with latch means to arrest said mounting member in a position of tilt in which said output member is lifted off said ground.

4. The drive attachment as claimed in claim 1, further comprising cable means to release said mounting member from the position in which said output member is lifted off said ground.

5. The drive attachment as claimed in claim 1, wherein said first means is constituted by a manually operable detent fixedly mounted on said sleeve-like member and comprising a spring-loaded plunger adapted to selectively drop into either one of at least two bores provided in said first portion of said mounting member and thereby arresting said unit in either one of said at least two positions.

6. The drive attachment as claimed in claim 1, further comprising microswitch means to cut off power to said input member when the steepness of tilt about an axis substantially parallel to the common axis of the rear wheels of said wheelchair exceeds a pre-determinable limit.

7. The drive attachment as claimed in claim 1, further comprising a safety roller mounted on an arm attached to said unit in such a spatial relationship with said drive wheel that when, due to an obstacle in the path of said wheelchair, the acute angle included between the ground and a plane passing through an axis of tilt of said mounting members on the one hand and through the point of tangency of said wheel with said ground on the other, exceeds a predetermined limit, said roller, being thereby pressed against the ground, will cause said wheel to lose drive contact with the ground.

8. The drive attachment as claimed in claim 1, further comprising means to adjust the angular relationship between the vertical central plane of said drive wheel and the vertical plane containing the longitudinal axis of said wheelchair.

* * * * *